(12) United States Patent
Park

(10) Patent No.: US 7,113,657 B2
(45) Date of Patent: Sep. 26, 2006

(54) LASER DISPLAY DEVICE AND METHOD FOR CONTROLLING THE SAME

(75) Inventor: Chan Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 193 days.

(21) Appl. No.: 10/811,039

(22) Filed: Mar. 26, 2004

(65) Prior Publication Data

US 2004/0247222 A1 Dec. 9, 2004

(30) Foreign Application Priority Data

Mar. 27, 2003 (KR) .................. 10-2003-0019280

(51) Int. Cl.
G02F 1/035 (2006.01)
G02F 1/295 (2006.01)
(52) U.S. Cl. .............................. 385/3; 385/4
(58) Field of Classification Search .......... 385/4, 385/3
See application file for complete search history.

(56) References Cited

U.S. PATENT DOCUMENTS

| | | | | |
|---|---|---|---|---|
| 4,102,579 A | * | 7/1978 | Stewart .................. 356/73.1 |
| 5,314,365 A | * | 5/1994 | Chen ....................... 446/133 |
| 5,461,686 A | * | 10/1995 | Weinberger et al. ......... 385/32 |
| 5,633,494 A | * | 5/1997 | Danisch ................. 250/227.16 |
| 5,715,337 A | * | 2/1998 | Spitzer et al. ................. 385/4 |
| 6,104,371 A | * | 8/2000 | Wang et al. ................ 345/102 |
| 6,358,748 B1 | * | 3/2002 | Weiss ....................... 436/172 |

FOREIGN PATENT DOCUMENTS

| | | | |
|---|---|---|---|
| JP | 63-235912 | | 9/1988 |
| JP | J1-236070 | * | 9/1989 |
| JP | J4-256801 | * | 9/1992 |

* cited by examiner

*Primary Examiner*—Kaveh Kianni
(74) *Attorney, Agent, or Firm*—Lee, Hong, Degerman, Kang & Schmadeka

(57) ABSTRACT

A laser display device and a method for controlling the same are disclosed. The laser display device includes a laser light source generating laser beams, an optical fiber transmitting the laser beams generated from the laser light source, and a light phase controller forming a curve in the optical fiber, so as to control a phase of the laser beams passing through the optical fiber.

7 Claims, 5 Drawing Sheets

LASER DISPLAY DEVICE AND METHOD FOR CONTROLLING THE SAME

CROSS-REFERENCE TO RELATED APPLICATIONS

This application claims the benefit of Korean Application No. P2003-019280, filed on Mar. 27, 2003, which is hereby incorporated by reference as if fully set forth herein.

BACKGROUND OF THE INVENTION

1. Field of the Invention

The present invention relates to a display device, and more particularly, to a laser display device and a method for controlling the same. Although the present invention is suitable for a wide scope of applications, it is particularly suitable for controlling a phase of a laser beam, so as to eliminate a speckle effect from a screen displaying a projected image, thereby clarifying image on the screen for the viewers.

2. Discussion of the Related Art

The projection display device is a display device whereby a small screen is enlarged and projected to display large-sized screen. Generally, among a wide range of projectors, mostly consisting of a light source and a illumination part enlarging and projecting a film and picture image on a screen, a projector adopting a cathode ray tube (CRT) is most widely used. However, recently, projectors having a liquid crystal display mounted thereon are being supplied more increasingly.

In addition, such projectors can be connected to a personal computer or a video tape recorder (VTR), so as to be applied for viewing movies or carrying out various types of presentations through a wider screen.

Meanwhile, the projection display device using a lamp as a light source is disadvantageous in that the color tone, resolution, range of color representation, and contrast of the picture image are lower than those of other self-emissive display devices.

Accordingly, a laser display device using a light amplification by simulated emission radiation (LASER), hereinafter referred to as a "laser", has been developed in order to resolve such problems.

By using a laser light source, the laser display device can display an image having a high color resolution and an excellent color representation very close to the natural colors. Also, due to the high contrast of the laser display device, an image of an excellent high-resolution picture quality can be represented.

FIG. 1 illustrates a structure of a general laser display device.

Referring to FIG. 1, the laser display device consists of a laser light source 11 generating a laser beam, a illumination optical part 12 irradiating the laser beam generated from the laser light source 11 to an image display device 13, an image display device 13 displaying a picture image by using the irradiated laser beam 11, a projection optical part 14 enlarging and projecting the image displayed in the image display device 13, and a screen 15 on which the image enlarged by the projection optical part 14 is formed.

Herein, since the laser light source 11 generates a single-colored light beam, a red (R) laser light source, a green (G) laser light source, and a blue (B) laser light source are required in order to represent a color image.

The laser light source 11 uses a radiation of the internal energy of a matter, so as to generate light energy, which is then amplified. When generating a constant light energy, the laser light source 11 should use a gas laser light source, such as carbon dioxide. Conversely, when generating a large amount of spontaneous light energy, then the laser light source 11 should use a solid-state laser light source, such as ruby.

A semiconductor laser light source using arsenic (As) or gallium (Ga) can also be used.

However, unlike natural light, the light generated from the laser light source 11 generates coherent waves having the same frequency and phase.

Due to the characteristics of coherence in a laser, a laser disturbance occurs on the screen, thereby causing a speckle effect, which is an optical interference causing grainy white spots sparkling on the screen. The speckle effect decreases the contrast and resolution, thereby deteriorating the picture quality of an image.

SUMMARY OF THE INVENTION

Accordingly, the present invention is directed to a laser display device and a method for controlling the same that substantially obviate one or more problems due to limitations and disadvantages of the related art.

An object of the present invention is to provide a laser display device and a method for controlling the same that controls a phase of a laser beam, so as to eliminate a speckle effect from a screen displaying a projected image, thereby clarifying image on the screen for the viewers.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laser display device includes a laser light source generating laser beams, an optical fiber transmitting the laser beams generated from the laser light source, and a light phase controller forming a curve in the optical fiber, so as to control a phase of the laser beams passing through the optical fiber.

Herein, the laser light source includes a red laser light source, a green laser light source, and a blue laser light source.

The light phase controller includes a piezo device, first and second electrodes respectively formed on upper and lower surfaces of the piezo device, and providing power to the piezo device, and first and second fixation plates formed on the first electrode to fix the optical fiber.

Herein, the light phase controller further includes an elastic device for absorbing an oscillation of the optical fiber. The elastic device is formed at a bottom surface of the piezo device.

A groove for inserting the optical fiber is formed on the first and second fixation plates.

The piezo device includes a modifying layer being modified in accordance with a voltage applied to the first and second electrodes, and a fixed layer formed to be in contact with the modifying layer, and bending the modifying layer.

Herein, a degree of a curve formed on the optical fiber changes in accordance with a size of the oscillation of the piezo device.

In another aspect of the present invention, a method for controlling a laser display device includes applying a power on a piezo device, causing an oscillation in the piezo device, in accordance with the applied power, and generating a curve in an optical fiber in accordance with the oscillation of the piezo device, and controlling a phase of a light passing through the optical fiber by the curve in the optical fiber through a light phase controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
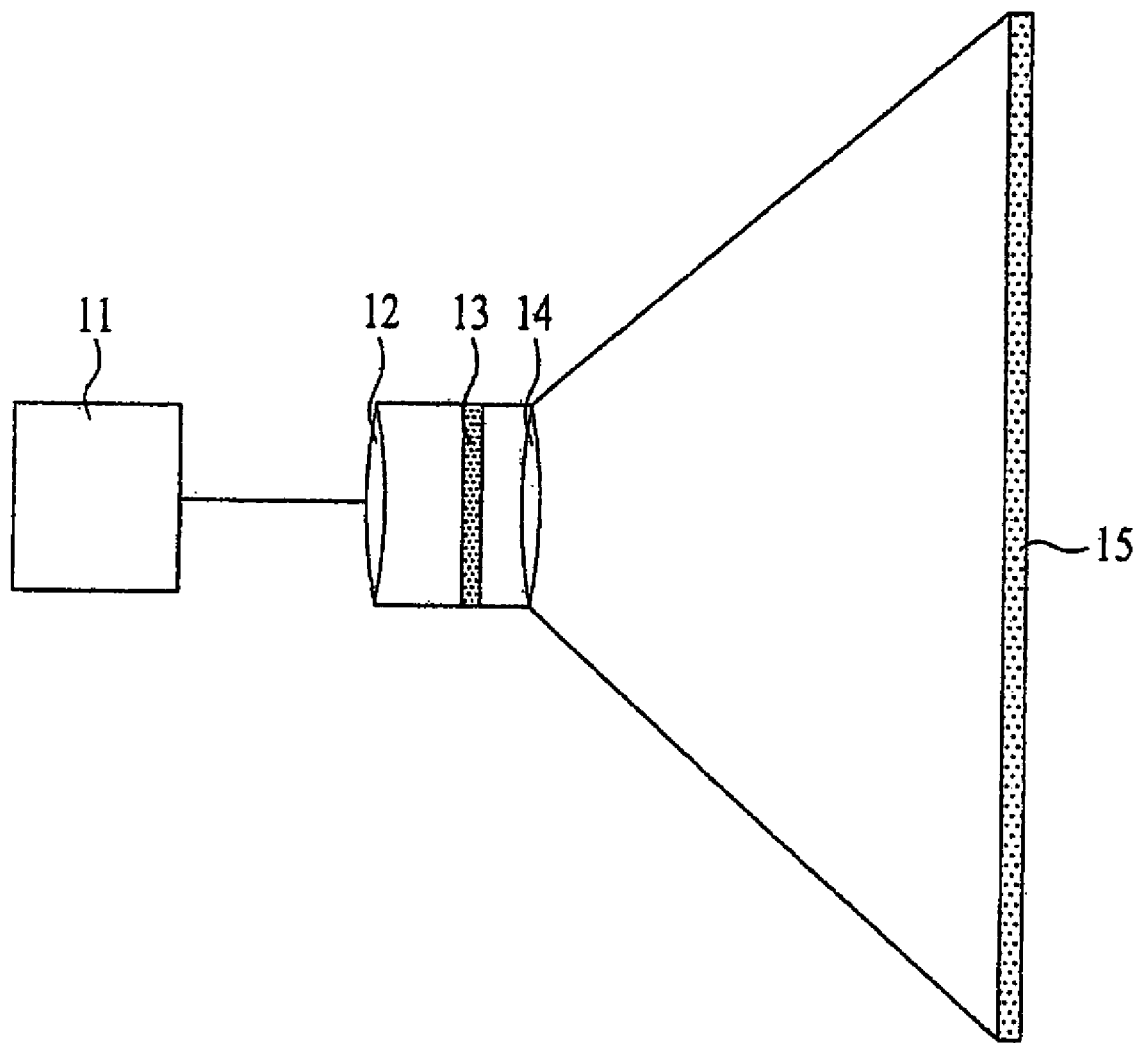
FIG. 1 illustrates a structure of a general laser display device.
Figure 2:
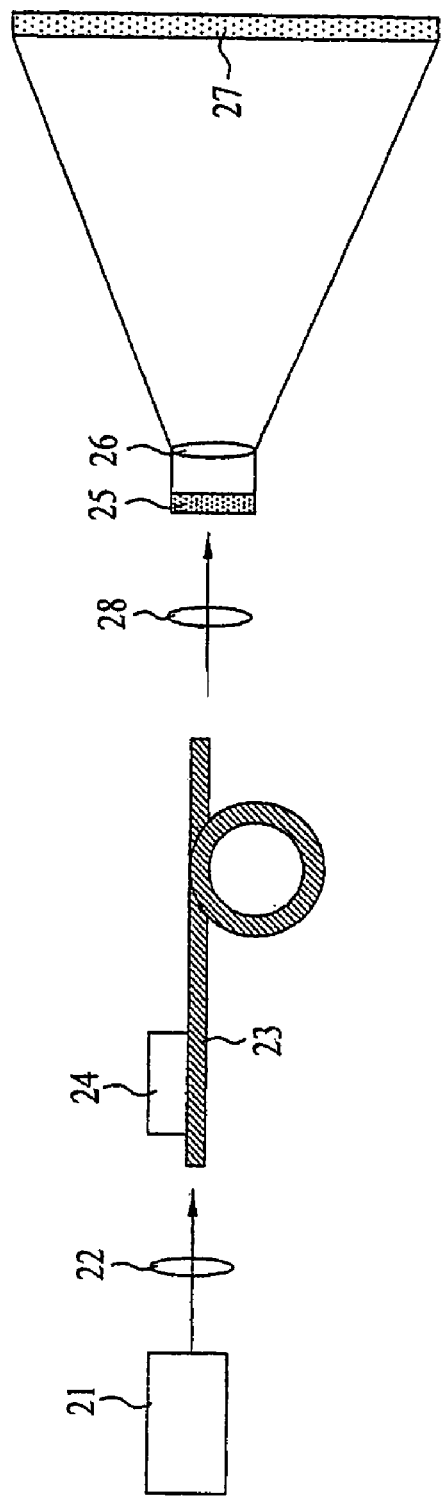
FIG. 2 illustrates a structure of a laser display device according to the present invention.

FIG. 2 illustrates a structure of a laser display device according to the present invention.

Referring to FIG. 2, the laser display device according to the present invention includes a laser light source 21 generating a laser beam, a first illumination optical part 22 emitting the laser beam generated from the laser light source 21 to an optical fiber 23, an optical fiber 23 transmitting the emitted laser beam towards a second illumination optical part 28, a light phase controller 24 changing a phase of the light passing through the optical fiber 23.

Also, the laser display device according to the present invention further includes a second illumination optical part 28 irradiating the light emitted from the optical fiber to a picture image display device 25, a picture image display device 25 displaying the picture image by using the light irradiated from the second illumination optical part 28, a projection optical part 26 enlarging and projecting the image displayed in the picture image display device 25, and a screen 27 on which the image enlarged by the projection optical part 26 is formed.

Herein, since the laser light source 21 generates a single-colored light beam, a red (R) laser light source, a green (G) laser light source, and a blue (B) laser light source are required in order to represent a color image.

The laser light source 21 uses a radiation of the internal energy of a matter, so as to generate light energy, which is then amplified. When generating a constant light energy, the laser light source 21 should use a gas laser light source, such as carbon dioxide. Conversely, when generating a large amount of spontaneous light energy, then the laser light source 21 should use a solid-state laser light source, such as ruby.

A semiconductor laser light source using arsenic (As) or gallium (Ga) can also be used.

However, unlike natural light, the light generated from the laser light source 21 generates coherent waves having the same frequency and phase.

The first illumination optical part 22 is formed of a lens and a prism in order to form an outline of an object or transmit a light energy by using the reflection or refraction of light. In addition, the first illumination optical part 22 radiates the light emitted from the light source to the optical fiber 23.

Meanwhile, the optical fiber 23 is generally formed of a single wire or a bundle of cables by using a transparent resin, such as glass or synthetic resin. The optical fiber 23 is used for transmitting information signals, outlines of objects produced by the light, and optical power.

The structure of the optical fiber 23 consists of a double cylindrical shape having a cladding envelop the peripheral area of the core formed in the center of the optical fiber 23. Also, the external surface of the optical fiber 23 is coated with one (1) or two (2) layers of synthetic resin coating, so as to protect the optical fiber 23 from external shock.

Since the core part of the optical fiber has a higher refractive index than the cladding, the light is focused on the core part, and due to its total internal reflection, the light can be passed through without being scattered to the outside. As described above, in various types of mode related to the size of the optical fiber or the distribution of the refractive index of the optical fiber, the light repeats a total internal reflection within the core. Accordingly, the light can be passed through with a lower loss.

Therefore, since the optical fiber 23 is free from disturbance or interference (or crosstalk) caused by external electromagnetic waves, the optical fiber 23 is very reliable in security. Moreover, the optical fiber 23 is also very resistant to indented forms (or curves) or other changes caused by external force.

The second illumination optical part 28 is formed of the same elements as those of the first illumination optical part 22. When the light is emitted from the optical fiber at an irregular phase, the second illumination optical part 28 irradiates the emitted light to the picture image display device 25.

The light phase controller 24 controls the phase of the irradiated light, which passes through the optical fiber 23 and to the second illumination optical part 28. The light phase controller 24 controls the phase of the light by indenting the optical fiber 23 with an external electrical signal.

Meanwhile, the picture image display device 25 is formed of a device that can control the light transmissivity, such as a liquid crystal display panel. And, the picture image display device 25 displays the picture image by controlling the transmissivity of the light emitted from the second illumination optical part 28.

Furthermore, the projection optical part 26 enlarges the picture image displayed in the picture image display device 25 into a large-sized screen, and then, forms the enlarged image on the screen 27.

Finally, a viewer can easily view the enlarged image formed on the screen 27.

Figure 3:
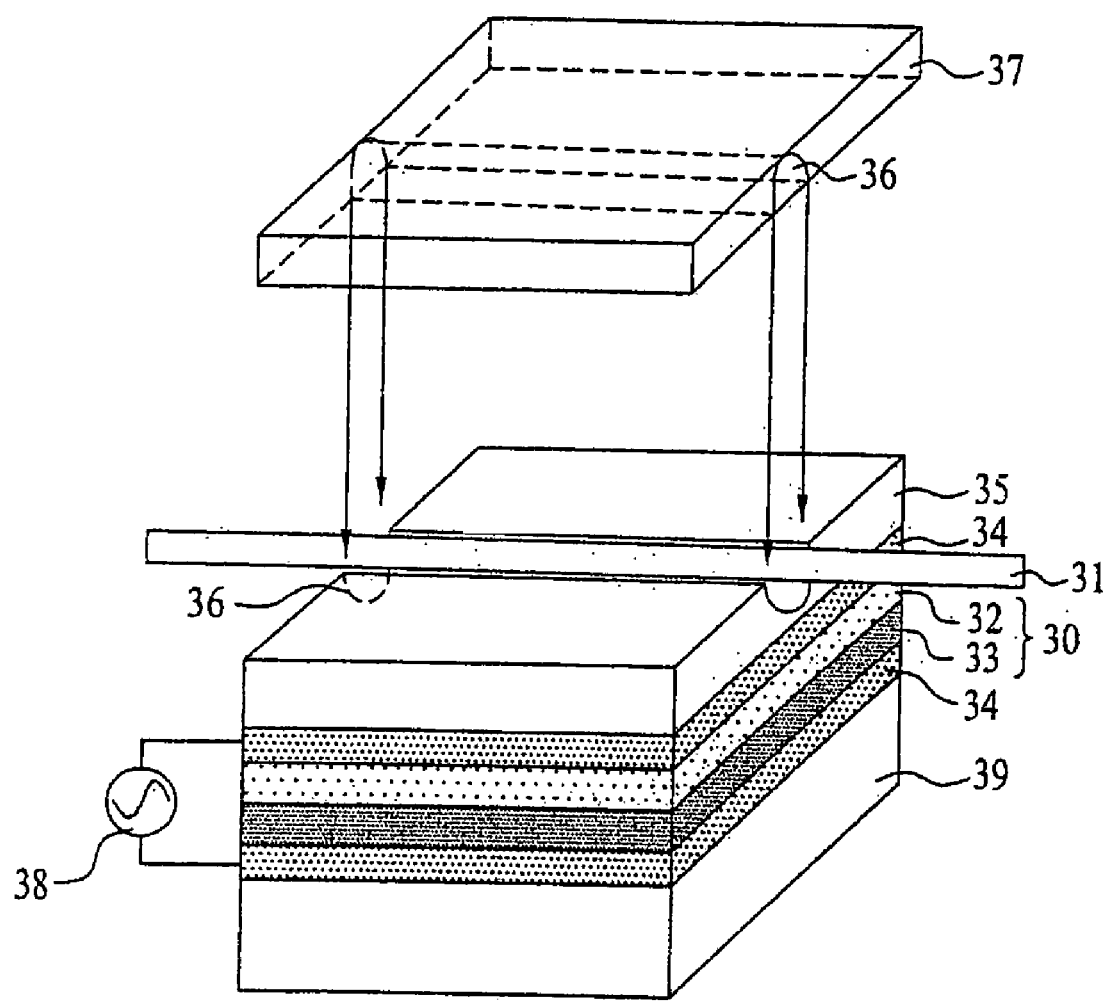
FIG. 3 illustrates a structure of a light phase controller of the laser display device according to the present invention.

FIG. 3 illustrates a structure of a light phase controller of the laser display device according to the present invention.

Referring to FIG. 3, the light phase controller of the laser display device according to the present invention includes a piezo device 30.

The piezo device 30 is formed as a thin layer including a modifying layer 32 and a fixed layer 33. In the modifying layer 32, the form of the layer is modified due to an electrical signal. And, an oscillation is generated from the fixed layer 33, due to an interaction between the fixed layer 33 and the modifying layer 32 contacting the fixed layer 33.

The modifying layer 32 and the fixed layer 33 are connected to a power 38 through first and second electrodes 34, respectively.

Also, upper and lower fixation plates 35 and 37 are formed on the first and second electrodes 34, so as to allow the optical fiber 31 to be inserted therein. A groove 36 for fixing the optical fiber 31 is formed on each of the upper and lower fixation plates 35 and 37. Depending upon the shape of the periphery of the optical fiber 31, the groove 36 is form to have a shape corresponding to that of the periphery of the optical fiber 31.

Meanwhile, when an oscillation occurs from the piezo device 30, the oscillation is equally transmitted to the optical fiber 31, as well as the laser display device having the light phase controller fixed thereto. Moreover, a noise may occur on the screen, due to the oscillation of the laser display device.

Accordingly, an elastic device 39 is formed at the bottom of the piezo device 30. The elastic device 39 absorbs the oscillation of the piezo device 30, thereby preventing the oscillation from being transmitted to the laser display device and reducing unnecessary noise from the screen.

Figure 4A:
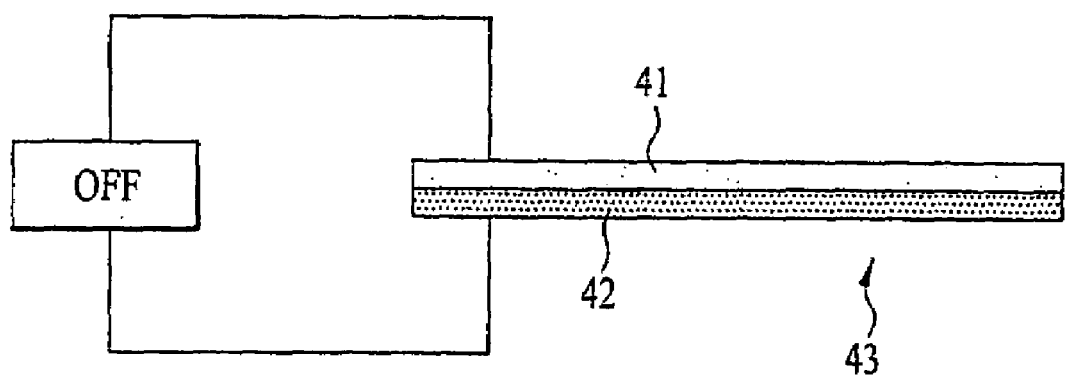
FIGS. 4A and 4B illustrate operation principles of the light phase controller of the laser display device according to the present invention.
Figure 4B:
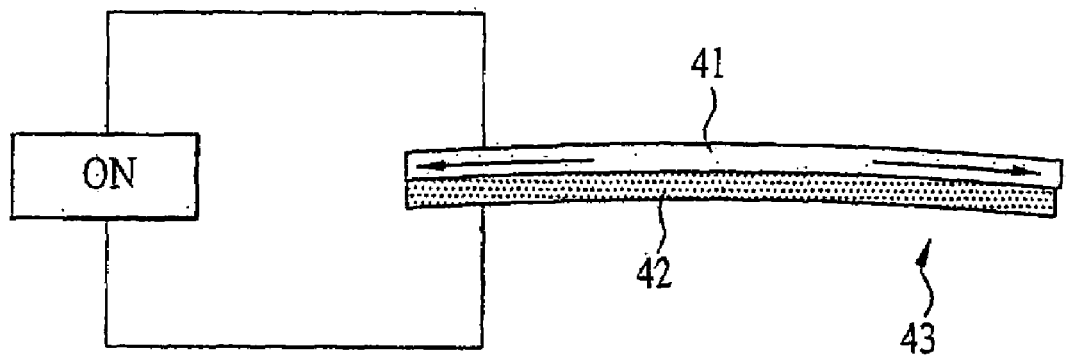

FIGS. 4A and 4B illustrate operation principles of the light phase controller of the laser display device according to the present invention.

As described above, the light phase controller includes a piezo device 43, the form of which is modified depending upon the electrical signal. The piezo device 43 is driven at a very low driving power. Herein, a frequency and amplitude of the piezo device 43 can be controlled by a change in the electrical signal.

Referring to FIG. 4A, when a voltage is not applied to the modifying layer 41 and the fixed layer 42 of the piezo device 43, the shape of the piezo device 43 is not modified. Conversely, as shown in FIG. 4B, when a voltage is applied to the modifying layer 41 and the fixed layer 42, then the modified layer 41 is either expanded or contracted. The degree of the modification differs in accordance with the amount of voltage applied to the electrode of the piezo device 43. Also, modification and restoration processes are repeated depending upon whether the power is on or off.

Accordingly, an oscillation occurs as the modification and restoration processes are repeated in the piezo device 43. The oscillation is then transmitted to the optical fiber 31, so as to produce fine curves in the optical fiber 31. Due to such fine curves, the phase of the light passing through the optical fiber 31 is modified.

As described above, by controlling the phase of the light passing through the optical fiber, the speckle effect resulting from a disturbance can be prevented. Herein, the speckle effect refers to small sparkling spots occurring on a screen, which can be easily seen by the viewers.

Figure 5:
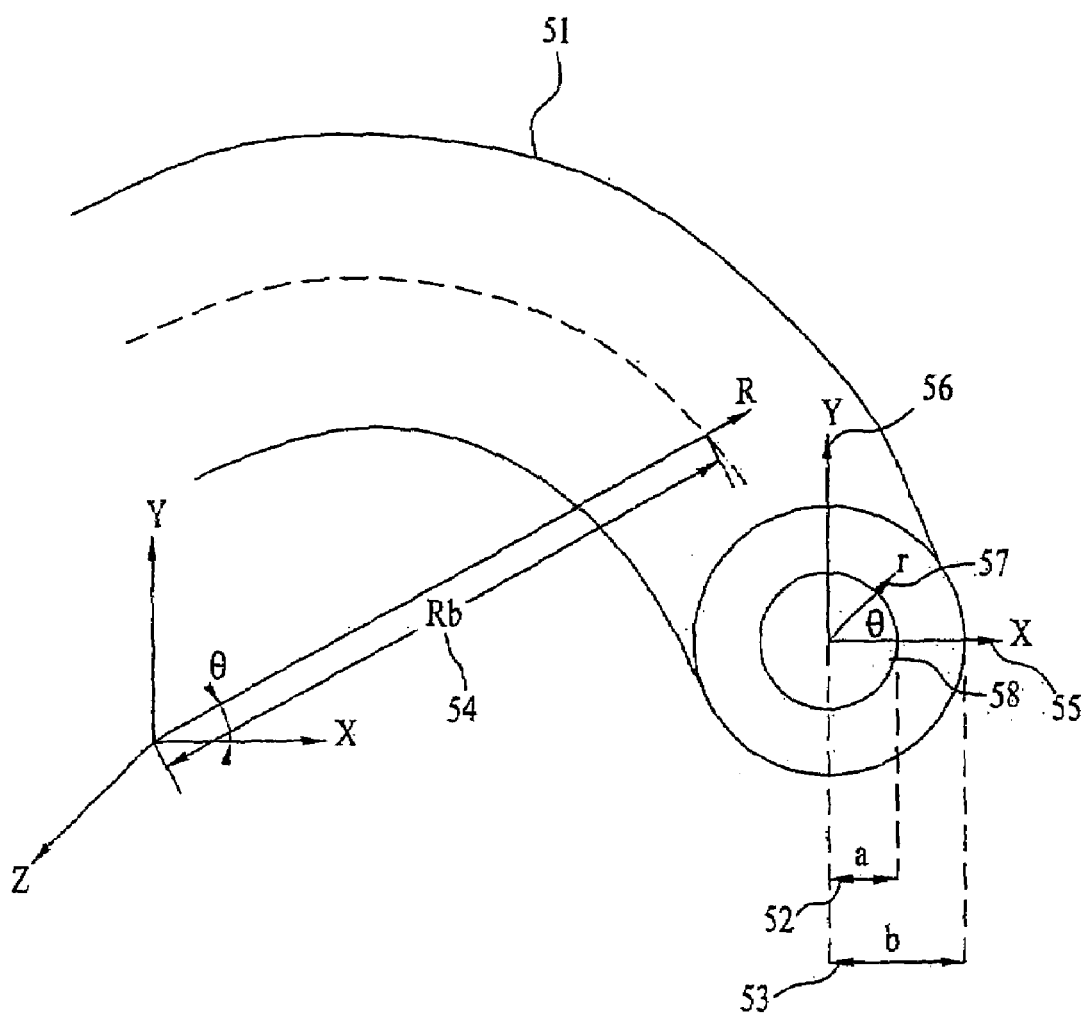
FIG. 5 illustrates a principle of removing a speckle effect in the laser display device according to the present invention.

FIG. 5 illustrates a principle of removing a speckle effect in the laser display device according to the present invention.

When a voltage is applied to the first and second electrodes of the light phase controller, the optical fiber is curved, as shown in FIG. 5. More specifically, because of the piezo device, a fine modification is formed to curve the optical fiber, which is originally formed in a straight-line shape.

Herein, 'a' represents a core radius 52 of the optical fiber, and 'b' is an optical fiber radius 53 including the core and the cladding. Also, '$R_b$' represents a curve radius of the optical fiber 51.

Meanwhile, the state of the light passing through the curved optical fiber 51 can be represented in equations between the 'a' and 'b' values and X-axis coordinates 55, Y-axis coordinates 56, r coordinates 57, Φ coordinates 58, and time (t).

The electric field E of the light passing through the optical fiber can be explained by the wave equation that follows.

$$\nabla^2 \vec{E} - \frac{n^2}{c^2}\frac{\partial^2}{\partial t^2}\vec{E} = 0 \qquad \text{Equation 1}$$

Herein, n represents the index of refraction, c is the speed of light, and t represents the time.

However, since a laser beam emits straight light rays, the electric field may only consider the real number of the equation as shown below.

$$\vec{E}(x, y, z, t) = Re[E(x, y, z)e^{j\omega t}] \qquad \text{Equation 2}$$

Herein, x represents the X coordinates, y is the Y coordinates, z represents the Z coordinates, and t is the time.

Herein, a scalar equation, which is one of the wave equations of Equation 1 can be represented as follows.

$$\nabla^2 E + \frac{n^2\omega^2}{c^2}E = 0 \qquad \text{Equation 3}$$
$$\nabla^2 E + k^2 n^2 E = 0$$

Herein, k represents a propagation constant of a light in a vacuum state, n is the refraction index, and ω represents the phase of the optical fiber.

Meanwhile, when the optical fiber is curved at a radius of $R_b$ is formed from an R-axis direction, as shown in FIG. 5, the Equation 3 can be represented as follows by using a cylindrical coordinate system of R, θ, and Y.

$$\left[\frac{\partial^2}{\partial R^2} + \frac{1}{R}\frac{\partial}{\partial R} + \frac{1}{R^2}\frac{\partial^2}{\partial \theta^2} + k^2 n^2\right]E_R = 0 \qquad \text{Equation 4}$$

Herein, R represents the direction coordinates of the curve radius of the optical fiber.

Meanwhile, the following equation should be used in order to convert the equation in accordance with a new coordinate system (r, Φ, y) on the optical fiber.

$$R = R_b + r \qquad \text{Equation 5}$$

$$\theta = \frac{z}{R_b}$$

$$E_R(r, \phi) = \left(1 + \frac{r}{R_b}\right)^{-\frac{1}{2}} E_r(r) e^{-j\beta\phi}$$

In other words, the scalar wave equation can be represented as the following single equation.

$$\left[\frac{\partial^2}{\partial r^2} + \frac{1}{r}\frac{\partial}{\partial r} + \frac{1}{r^2}\frac{\partial^2}{\partial \phi^2} + k^2 n^2 + \left(1 + \frac{r}{R_b}\cos\phi\right)^{-1}\left(\frac{1}{4R_b^2} - \beta^2\right)\right] E_{r=0} \qquad \text{Equation 6}$$

Herein, when the $b/R_b$ value is very small, in other words, when the optical fiber is curved, the result of the Equation 6 can be represented as a series of the $b/R_b$ value.

$$E_r = \sum_{m=0}^{\infty} (b/R_b)^m E_m, \quad \text{for} \frac{b}{R_b} \ll 1 \qquad \text{Equation 7}$$

In the above Equation 7, when the $b/R_b$ value is very small, the equation can be considered to have the m value of approximately 1 (i.e., m=1). Accordingly, when m=1, the Equation 7 can be represented as follows.

$$E_r = E_0 + (b/R_b) E_1 \qquad \text{Equation 8}$$

Herein, $E_0$ represents the electric field of the light, when the optical fiber 51 is not curved. And, $E_1$ represents the electric field, when a minute primary change occurs in the optical fiber.

As shown in the above equation, the electric field of the light emitted to the optical fiber is categorized into the electric field generated when the optical fiber is not curved, and the electric field generated when the optical fiber is curved. Thus, a change in the light phase occurs.

In other words, depending upon the oscillation of the piezo device 43, the curve radius $R_b$ of the optical fiber changes in accordance with the change in time. As a result, the electric field of the light also irregularly varies in accordance with the change in time.

Therefore, the oscillation in the optical fiber causes an irregular change in the laser beam having a regular light phase, thereby removing the speckle effect from the screen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A laser display device, comprising:
   a laser light source generating laser beams;
   an optical fiber transmitting the laser beams generated from the laser light source; and
   a light phase controller forming a curve in the optical fiber so as to control a phase of the laser beams passing through the optical fiber,
   wherein the light phase controller comprises a piezo device and first and second electrodes formed on upper and lower surfaces, respectively, of the piezo device, the first and second electrodes providing power to the piezo device and the first electrode having first and second fixation plates formed thereon to fix the optical fiber.

2. The device according to claim 1, wherein the laser light source includes a red laser light source, a green laser light source, and a blue laser light source.

3. The device according to claim 1, wherein the light phase controller further comprises an elastic device for absorbing an oscillation of the optical fiber.

4. The device according to claim 3, wherein the elastic device is formed at a bottom surface of the piezo device.

5. The device according to claim 1, wherein a groove for inserting the optical fiber is formed on the first and second fixation plates.

6. The device according to claim 1, wherein the piezo device comprises:
   a modifying layer being modified in accordance with a voltage applied to the first and second electrodes; and
   a fixed layer formed to be in contact with the modifying layer, and bending the modifying layer.

7. The device according to claim 1, wherein a degree of a curve formed on the optical fiber changes in accordance with a size of the oscillation of the piezo device.

* * * * *